(12) United States Patent
Chung et al.

(10) Patent No.: US 8,172,413 B2
(45) Date of Patent: May 8, 2012

(54) KEYPAD ASSEMBLY

(75) Inventors: Muh Fong Chung, Bukit Jambul (MY); Choon Guan Ko, Sungai Dua (MY); Sian Tatt Lee, Persiaran Tanjung Bungah (MY); Fook Chuin Ng, Taman Bayu (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 150 days.

(21) Appl. No.: 12/711,583

(22) Filed: Feb. 24, 2010

(65) Prior Publication Data

US 2011/0203911 A1 Aug. 25, 2011

(51) Int. Cl.
*H04M 1/22* (2006.01)
(52) U.S. Cl. ......... 362/24; 362/97.3; 362/610; 362/615; 345/168; 345/169
(58) Field of Classification Search .............. 362/23–24, 362/88, 97.1–97.3, 253, 555, 600, 610, 615; 345/168–169
See application file for complete search history.

(56) References Cited

U.S. PATENT DOCUMENTS

| 7,186,935 | B2 | 3/2007 | Lee et al. |
| 7,294,803 | B2 | 11/2007 | Lee et al. |
| 7,429,709 | B2 | 9/2008 | Kim |
| 7,534,001 | B2 | 5/2009 | Liu |
| 2009/0179862 | A1* | 7/2009 | Strong, IV ............... 345/169 |

FOREIGN PATENT DOCUMENTS

WO 2009038295 A2 3/2009

OTHER PUBLICATIONS

U.S. Appl. No. 11/941,678, filed Nov. 16, 2007 for Segmented Light Guide.

* cited by examiner

*Primary Examiner* — Stephen F Husar
*Assistant Examiner* — Meghan Dunwiddie

(57) ABSTRACT

A keypad assembly having a light guide sheet having a first surface with a layer of graphics printed thereon, a second surface opposite the first surface, and an edge surface; and a flexible sheet having a central portion engaged with the light guide sheet second surface and having a peripheral portion positioned in light blocking relationship with the light guide sheet edge surface.

20 Claims, 4 Drawing Sheets

KEYPAD ASSEMBLY

BACKGROUND

Keypads for electronic devices such as cell phones and other hand held devices are typically complex assemblies that represent a significant portion of the cost of such electronic devices. Development of reliable cost effective keypads remains an ongoing challenge.

DETAILED DESCRIPTION

Figure 1:
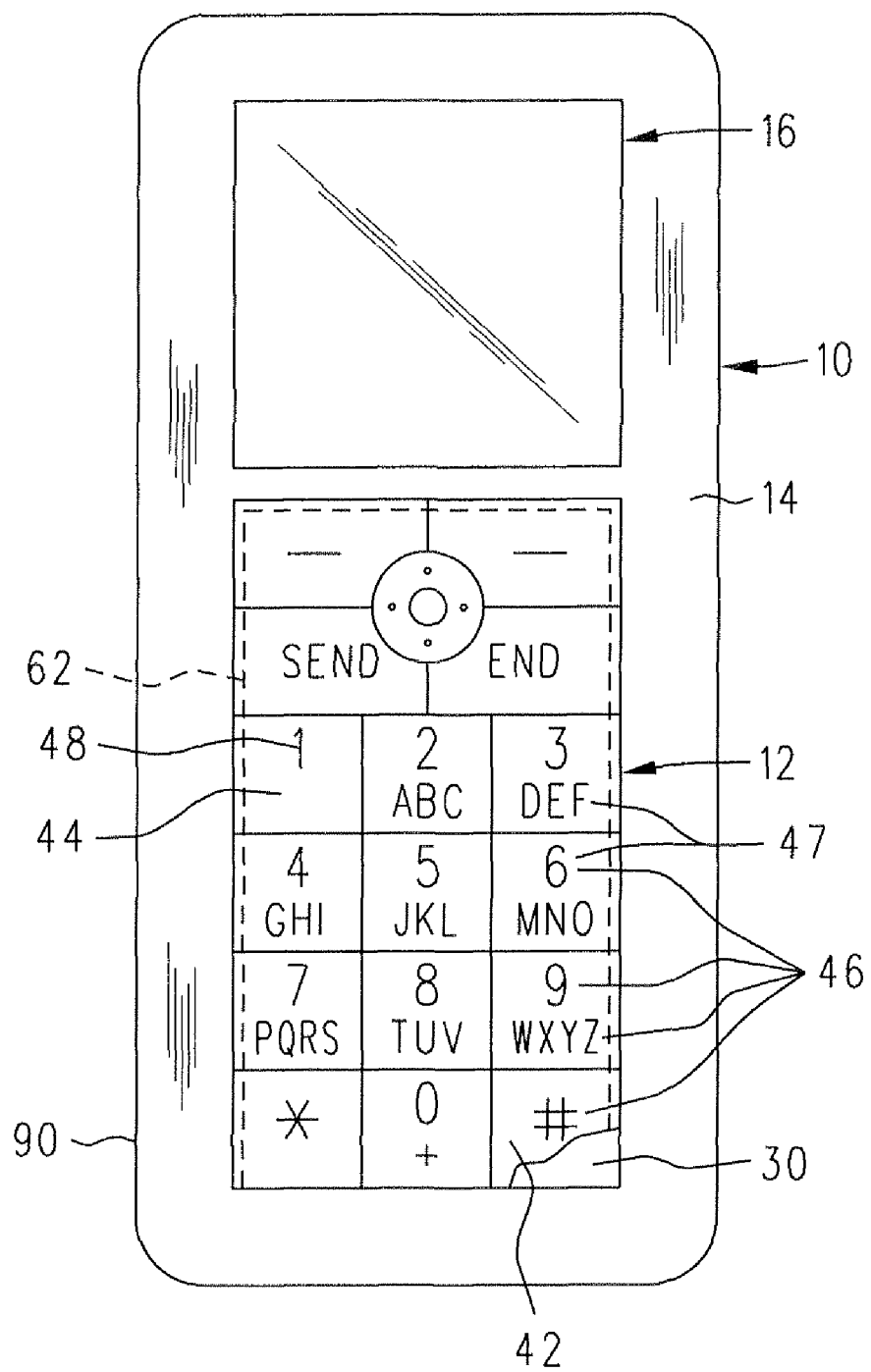
FIG. 1 is a top plan view of a digital electronic device with a keypad assembly.

FIG. 1 illustrates an electronic device 10 having a keypad assembly 12 mounted within a casing 14. The casing may also house a display 16. The keypad assembly 12 comprises a light guide sheet 30 having a graphics print layer 42 on its upper surface. A peripheral portion of a flexible sheet 62 which is attached to the light guide sheet 30 is also covered by the print layer 42. The graphics may comprise various indicia 46 such as alphanumeric characters, symbols and artistic designs which are translucent or transparent regions of the graphics that are illuminated by light transmitted thorough and reflected off the lower surface of the light guide sheet 30. The indicia 46 are positioned in a plurality of separate key regions 47, which are adapted to be pushed by an operator. Although FIG. 1 shows a cell phone, the keypad assembly further described herein may be used in any electronic device such as a digital camera, PDS, laptop computer, GPS unit or any other electronic device that employs a keypad.

Figure 2:
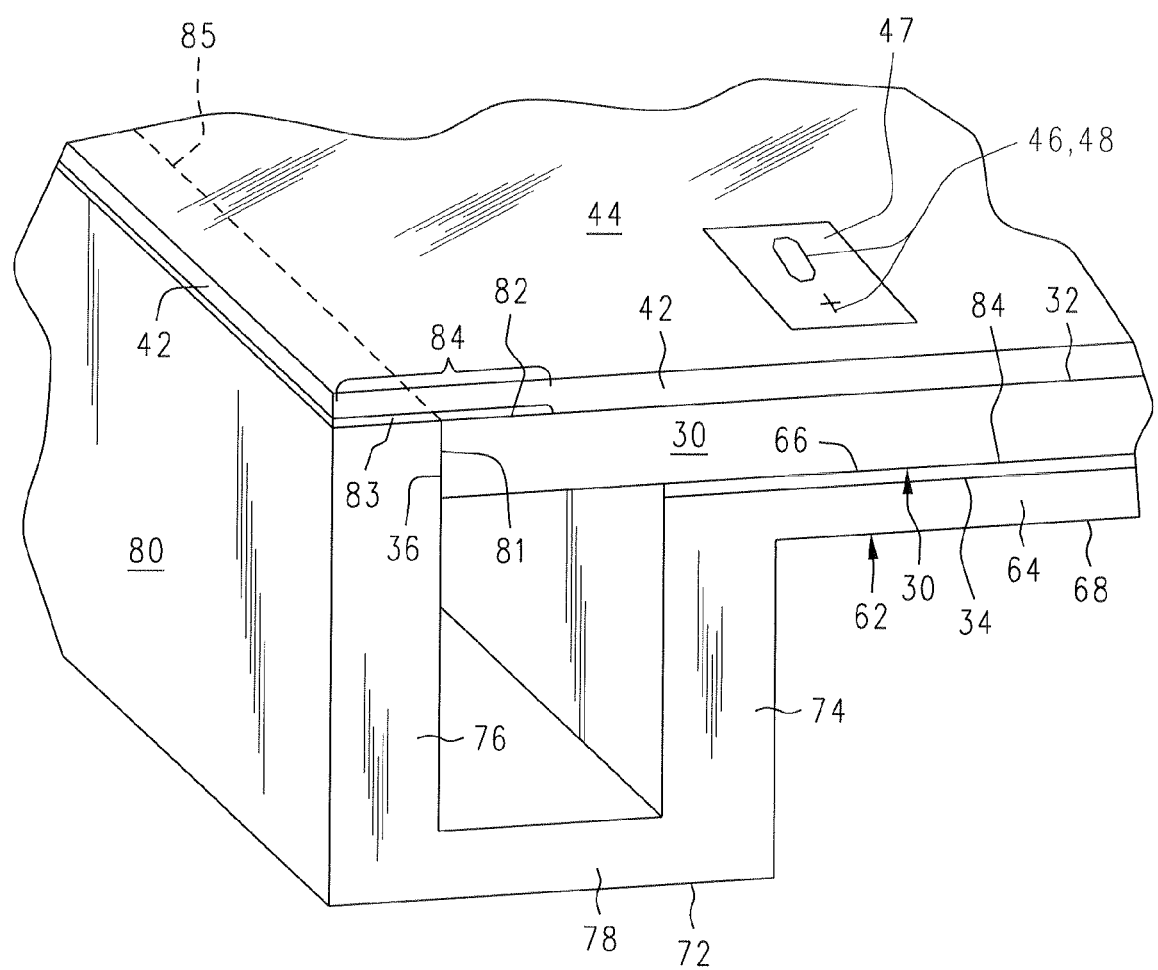
FIG. 2 is a detailed, cross sectional, perspective view of a portion of a printed light guide sheet and attached flexible sheet.

FIG. 2 is a detailed, cross sectional, perspective view illustrating the construction of one sub assembly of the keypad 12. A generally flat, flexible light guide sheet 30 has a first or top surface 32 a second or bottom surface 34 and an edge surface 36 extending between the first and second surfaces 32, 34. The light guide sheet may have different thicknesses depending upon the specific embodiment in which it is used. In one embodiment in which the light guide sheet is a plastic film sheet a typical thickness range is 0.1 mm to 1.0 mm. The designations "top" and "bottom" as used herein assume a keypad orientation with the operating face of the keypad facing upwardly.

The light guide film sheet has a graphics print layer 42 which is printed directly onto the top surface 32 of the sheet. The printed graphics layer 42 is opaque, generally black, except for transparent or translucent regions, e.g. 48, which are to be illuminated. The transparent or translucent regions 48 are typically indicia, such as alphanumeric characters, symbols and the like 46 (only the zero key is shown in FIG. 2). The print layer may have various thicknesses depending upon the type of ink employed, etc. In one embodiment the thickness of the print layer is in a range of between 0.01 mm and 0.10 mm, although other ink layer thicknesses may be used. The print layer 42 forms the outer surface 44 of the keypad 12. For ease of illustration of FIG. 1, the alphanumeric characters which are to be illuminated by the light guide are represented with dark ink and the remainder of the light guide surface is shown to be clear. It is to be understood that in the actual assembly, the alphanumeric characters and symbols would typically be transparent or translucent so as to be illuminated by light transmitted from the light guide sheet, and the remainder of the area of the keypad would be covered with opaque ink. The ink layer may be printed by various known printing techniques, such as silk screen printing, offset printing, pad printing, or by any other printing technique now known or later developed, which provides sufficient ink coverage to prevent light penetration.

Figure 3:
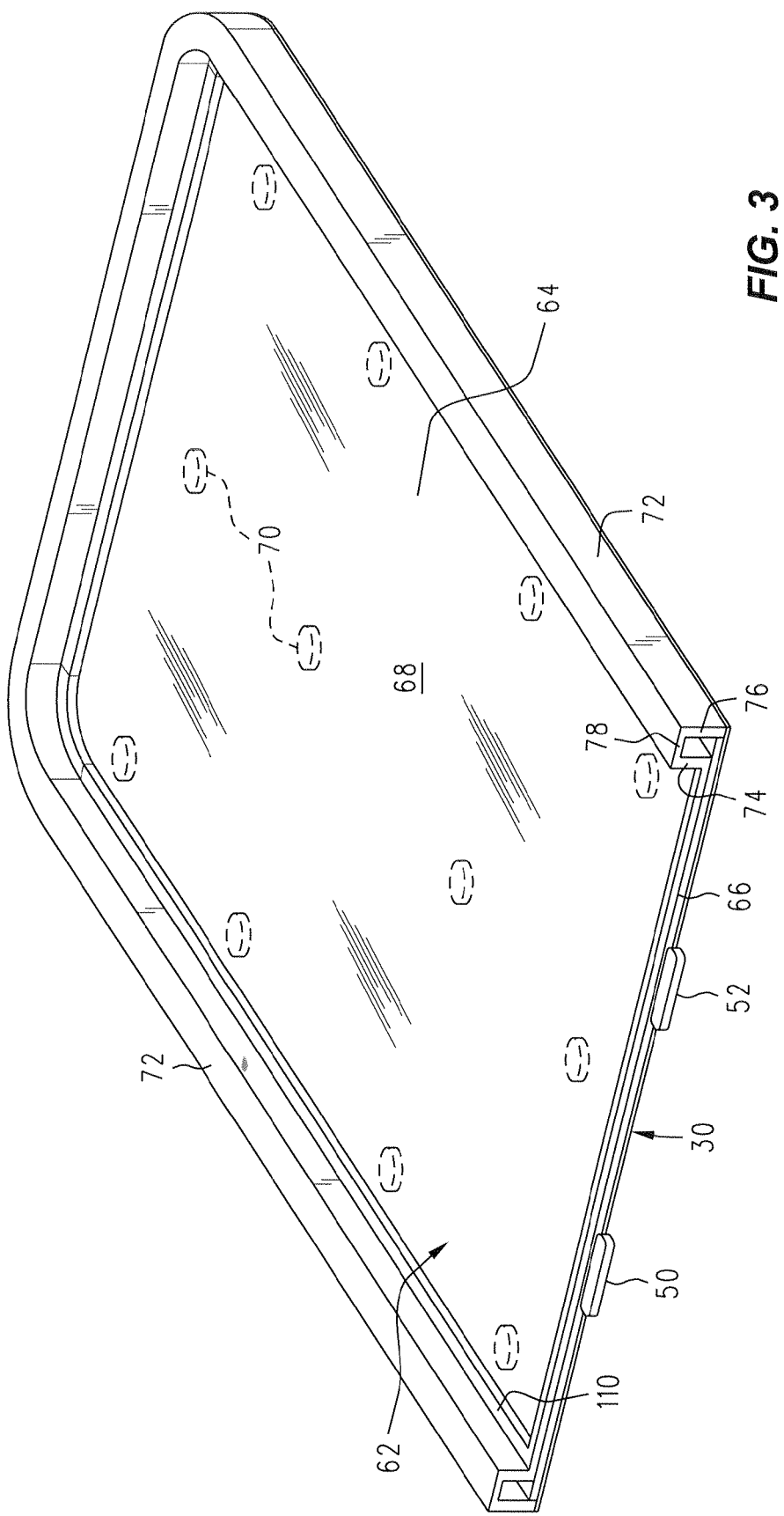
FIG. 3 is a perspective view of the light guide film sheet and flexible sheet of FIG. 2 with attached illumination sources.

As illustrated in FIG. 3, light sources 50, 52 are optically coupled to an edge portion of the light guide film sheet 30. The light sources 50, 52 may be light emitting diodes (LED's). Light from the LED's enters the light guide sheet and strikes reflective dots positioned near the bottom surface 34 of the light guide sheet 30 which causes the light to be reflected upwardly and out through the portions of the top surface 32 that are not covered with opaque ink. Light guide film sheets of this type are known in the art and will thus not be further described. Applicants have discovered that light which is not reflected out the top surface of the light guide sheet may leak out through edge portion 36 of the light guide sheet, creating a defective appearance in the keypad. Covering the edge portion 36 with ink has proven difficult and ineffective due to the small dimension of this edge surface. However, this problem is solved by the construction described below.

Figure 4:
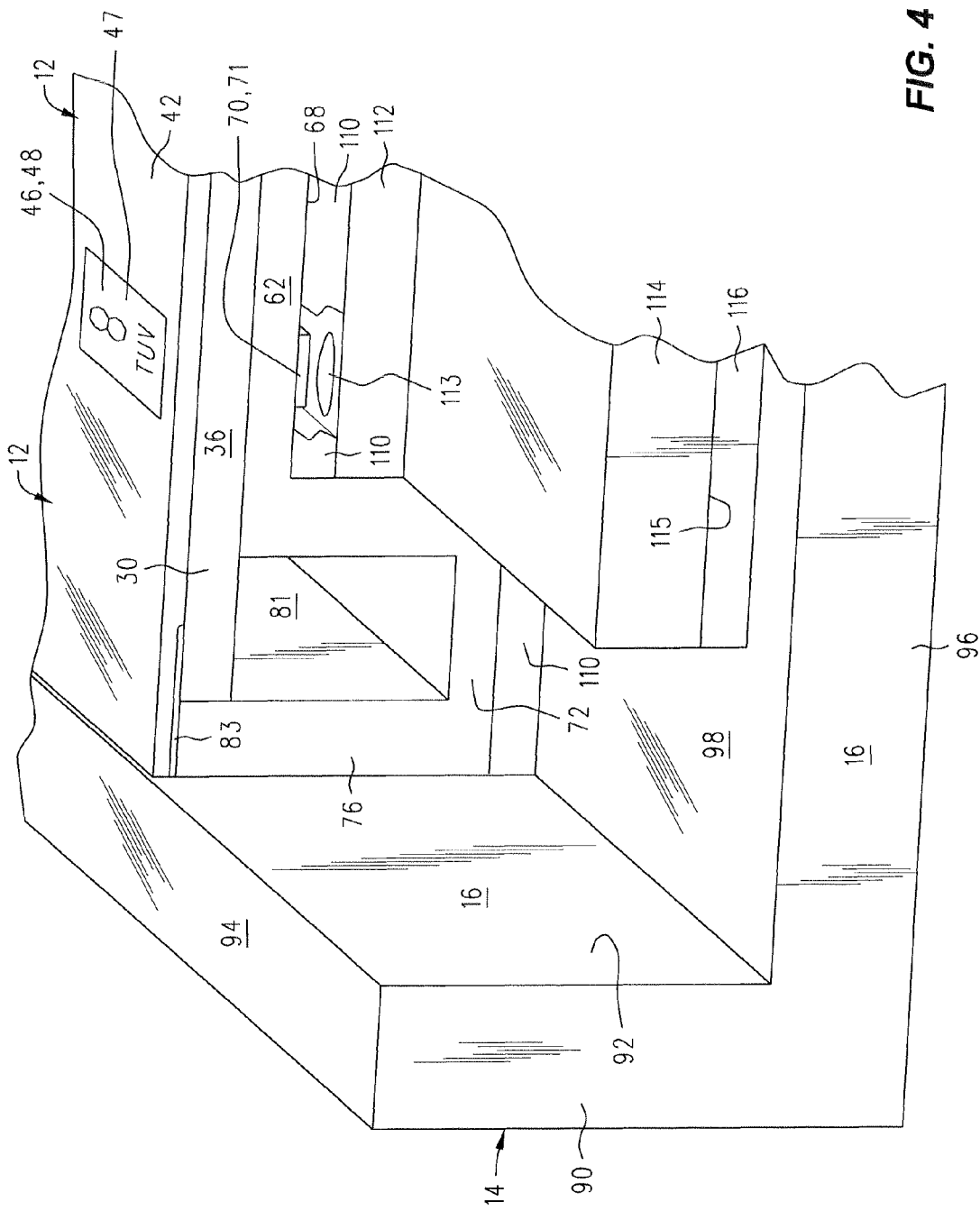
FIG. 4 is a detailed, cutaway, perspective view of a portion of a digital electronic device keypad assembly and casing.

As best illustrated by FIGS. 2, 3 and 4, a flexible sheet 62, which in some embodiments may comprise a soft, flexible rubber sheet such as epoxy rubber or silicon rubber, is attached to the light guide film sheet 30. (FIG. 3 shows the light guide sheet 30 and attached flexible sheet 62 in an upside down position with respect to the orientation of FIGS. 1, 2 and 4.) The flexible sheet 62 has a generally flat central portion 64 which has a first or top surface 66 and a second or bottom surface 68 opposite the first surface 66. In one embodiment, plungers 70, shown in dash lines in FIG. 3, extend downwardly from the central portion of the sheet and are aligned with predetermined graphics on the attached flexible sheet 62. In other embodiments, no plungers are provided and the second surface 68 is uniformly flat. The central portion of the flexible sheet is attached, at the top surface 66 thereof to the bottom surface 34 of the light guide sheet 30, as by adhesive, e.g., adhesive layer 84 shown only in FIG. 2, heat bonding, or any other attachment technique now known or later developed that enables both sheets 30, 62 to stay connected while remaining resiliently deflectable.

The flexible sheet 62 may have a peripheral portion 72 having a generally U-shaped cross section which includes a shorter inner arm 74 and a longer outer arm 76 which are connected by a connecting portion 78. The longer outer arm 76 has an outward facing surface 80 which may abut casing surface 92 as described further below. The outer arm 76 also has a inwardly facing surface 81 which abuts light guide edge surface 36 as best shown in FIG. 2. The longer outer arm 76 has a top edge surface 82 which is flush with the top surface 32 of the light guide sheet. All of top edge surface 82 and an adjacent portion of top surface 32 of the light guide sheet are covered with adhesive 83 in a region 84. In one embodiment, region 84 may be about twice the width of the top edge surface 82 of the outer arm 76. Thus adjacent surfaces 81, 36 of the flexible sheet 62 and light guide sheet 30, respectably, are maintained in abutting contact, at least in part, by this adhesive layer on their respective upper surfaces which also acts to cover and hide the top surface transition line 85 between sheets 62 and 30. Applicants have discovered that due to the small surface dimension of edge 36 that a top surface adhesive layer 83 is generally superior to an adhesive layer applied directly to edge 36. The abutting contact between surfaces 81 and 36 may also be facilitated by the abutting engagement between outer arm 76 and casing side wall 90 described further below. The abutting engagement between light guide edge surface 36 and surface 81 of sheet 62 act to block leakage of light from edge surface 36. To facilitate light blocking, surface 80 may be coated with black ink. Alternatively, flexible sheet 62 my be constructed from a black or dark material which prevents passage of light. When a black flexible sheet 62 is used, it has been found advantageous to cover the upper surface 66 of generally flat central portion 64 with a light reflective coating such as white ink.

Again, top edge surface 82 of the flexible sheet is generally flush with the top surface 32 of the light guide film sheet 30. The transition line 85, FIG. 2, between the two sheets is obscured by the adhesive 83, which in some embodiments may seep into the seam between the sheets 30, 62 to further secure the abutting engagement of these sheets. The print layer 42 that covers the top surface of the light guide sheet also covers the top edge 82 of arm 76. The print layer in the region of line 85 may be opaque, typically black, to further prevent any light leakage through this transition region between the sheets 30 and 62. For illustrative purposes, both the print layer 42 and the adhesive layer 83 are shown with exaggerated thicknesses.

As best shown by FIGS. 1 and 4, the electronic device 10 may have a casing 14 including a sidewall 90. Sidewall 90 has an inwardly facing surface 92 and a top edge surface 94. A bottom wall 96 may be integrally formed with the sidewall 90. The bottom wall 96 has an upper surface 98 upon which various components of the device 10 may be supported. Referring to FIGS. 3 and 4, it may be seen that double sided tape 110 may be mounted at the periphery of the generally flat central portion 64 of the flexible sheet 62 on surface 68 thereof. The double sided tape 110 may also be attached to a pressure actuated switch layer such as dome switch sheet 112 and provides spacing between the dome switch sheet 112 and the flexible sheet 62. This spacing facilitates operation of the plungers 70 on the flexible sheet 62 when such an embodiment is employed. Pressure actuated switch layers such as dome switch sheet 112 having a plurality of pressure actuated dome switches 113 on one surface thereof are known in the art. FIG. 3 shows only 12 plungers for simplicity of illustration. However, it is to be understood that the number of plungers will generally correspond to the number of switches 113, FIG. 4, on the dome switch layer 112, which also corresponds to the number of indicia bearing keys 47 on the light guide layer that may be pressed by a user. Thus, each plunger 70 has a key 47 and a dome switch 113 aligned with it.

In another embodiment in which the flexible sheet 62 does not have plungers 70, the flexible sheet 62 may be attached to the dome switch sheet 112 by adhesive applied about peripheral portions of both sheets or by other attachment means. The dome switch sheet 112 may be conventionally mounted and electrically connected to a printed circuit board (PCB) 114. The printed circuit board 114 may be attached, as by double sided tape 116 positioned across its entire lower surface 115, to the surface 98 of the casing bottom wall or by any other attachment means such as adhesive, etc. Light sources 50, 52, FIG. 3, may be operably electrically connected to the PCB 114.

In operation, as best seen in FIG. 4, an operator may press on a selected indicia 46 printed key region 47 on the top surface of the light guide sheet 30, for example, the "8" key 48 of the keypad. This pressure applied by the operator causes the associated regions of the light guide sheet 30 and flexible sheet 62, including plunger 70 to deflect downwardly. Plunger 70 thus engages and downwardly deflects dome switch 113, causing generation of an appropriate electrical signal, which actuates the electronic device 10.

It will be seen from the above described construction that light emitted into the light guide by light sources 50, 52, etc. is prevented from leaking out the edge surface 36 of the light guide due to its light blocking, abutting relationship with the flexible sheet 62. In one embodiment of the flexible sheet 62, as shown in FIG. 3, the generally U-shaped periphery is not present on the end of sheet 62 which is adjacent to where light sources 50, 52 are positioned. Light leakage out an edge of the sheet 30 at which light sources are positioned is generally not a problem due to the fact that the light is directed away from this edge. However, in embodiments in which light sources are located at more than one edge of sheet 30, it may be desirable to extend the U-shape configuration around the entire periphery of the sheet 62. Although a flexible sheet 62 with a U-shaped periphery has been specifically described, it will be understood that various other configuration of the sheet 62 periphery, for example an L-shaped periphery, may be employed so long as an end portion of sheet 62 is positioned with one surface in light blocking relationship with edge 36 and another surface is positioned in flush relationship with the top surface of light guide sheet 30.

It will be understood from the above that an electronic device 10 has been described in which an edge portion 82 of a flexible sheet 62 and a top surface of a light guide sheet 30 have been printed with a continuous print layer 42. The print layer 42 defines the exposed surface of a keypad assembly 12. In one embodiment this continuous printed surface 42 is positioned flush with the upper surface of a casing 14.

While certain specific embodiment of the invention have been described herein, it is to be understood that the invention may be otherwise embodied and that the appended claims are intended to be construed to cover such other embodiments, except insofar as limited by the prior art.

What is claimed is:

1. A keypad assembly comprising:
   a light guide sheet having a first surface with a layer of graphics printed thereon, a second surface opposite said first surface, and an edge surface; and
   a flexible sheet having a central portion engaged with said light guide sheet second surface and having a peripheral portion abutting said light guide sheet edge surface such that the peripheral portion is positioned in light blocking relationship with said light guide sheet edge surface.

2. A keypad assembly comprising:
   a light guide sheet having a first surface with a layer of graphics printed thereon, a second surface opposite said first surface, and an edge surface; and
   a flexible sheet having a central portion engaged with said light guide sheet second surface and having a peripheral portion positioned in light blocking relationship with said light guide sheet edge surface, wherein said flexible sheet peripheral portion comprises a flush surface which is flush with said light guide sheet first surface and wherein said layer of graphics extends onto said flush surface.

3. The keypad assembly of claim 2 further comprising a layer of adhesive positioned below said layer of graphics on said flush surface of said flexible sheet and on a peripheral portion of said first surface of said light guide sheet.

4. The keypad assembly of claim 2, wherein said flexible sheet peripheral portion comprises a generally U-shaped cross section.

5. The keypad assembly of claim 2 wherein said flexible sheet comprises one of either epoxy rubber or silicon rubber.

6. The keypad assembly of claim 2, further comprising a pressure switch layer positioned adjacent said flexible sheet and actuatable by applying pressure to said printed surface of said light guide sheet.

7. The keypad assembly of claim 2, further comprising a casing having an interior wall surface positioned in abutting relationship with said flexible sheet peripheral portion.

8. The keypad assembly of claim 7, said casing having an exposed surface positioned in flush relationship with said flush surface of said flexible sheet.

9. The keypad assembly of claim 2, further comprising at least one light source positioned in light communicating relationship with said edge surface of said light guide sheet.

10. The keypad assembly of claim 9, wherein said light source comprises a light emitting diode.

11. The keypad assembly of claim 6, wherein said flexible sheet comprises a plurality of plungers extending towards said pressure switch layer.

12. The keypad assembly of claim 11 wherein each of said plungers is associated with a predetermined icon portion of said layer of graphics.

13. A method of constructing a keypad comprising:
attaching a central portion of a light guide sheet to a central portion of a flexible sheet;
positioning a peripheral portion of the flexible sheet in abutting engagement with an edge portion of the light guide sheet such that the peripheral portion of the flexible sheet is in a light blocking relationship with the edge portion of the light guide sheet.

14. A method of constructing a keypad comprising:
attaching a central portion of a light guide sheet to a central portion of a flexible sheet;
positioning a peripheral portion of the flexible sheet in light blocking relationship with an edge portion of the light guide sheet; and
printing an exposed surface of the light guide sheet and a peripheral portion of the flexible sheet with a layer of graphics.

15. The method of claim 14 comprising mounting the light guide sheet and the attached flexible sheet in the casing above a pressure switch layer.

16. The method of claim 15 comprising mounting the light guide sheet and the attached flexible sheet in the casing with the printed surfaces of the light guide sheet and the flexible sheet in flush relationship with the adjacent surface of the casing.

17. The method of claim 15 comprising aligning predetermined printed indicia in the layer of graphics with pressure switches in the pressure switch layer.

18. The method of claim 17 comprising aligning plungers on the flexible sheet with pressure switches in the pressure switch layer.

19. An electronic device comprising:
a keypad assembly comprising:
a light guide sheet having a first surface and a second surface opposite said first surface, and an edge surface;
a flexible sheet having a central portion engaged with said light guide sheet second surface and having a peripheral portion having a first surface positioned in light blocking relationship with said light guide sheet edge surface and a second surface positioned parallel to said first surface of said light guide sheet;
a layer of graphics printed over said light guide sheet first surface and said flexible sheet peripheral portion second surface; and
a casing having an interior wall surface positioned in abutting relationship with said flexible sheet peripheral portion and having an exposed surface positioned in flush relationship with second surface of said peripheral portion of said flexible sheet.

20. The electronic device of claim 19 further comprising a glue layer positioned over a portion of said first surface of said light guide sheet and over said flexible sheet peripheral portion second surface and underlying said layer of graphics.

* * * * *